Jan. 12, 1954
A. SMITH ET AL
2,665,621
CULTIVATOR ATTACHMENT
Filed April 13, 1951
FIG. 1
FIG. 3
FIG. 2
FIG. 4
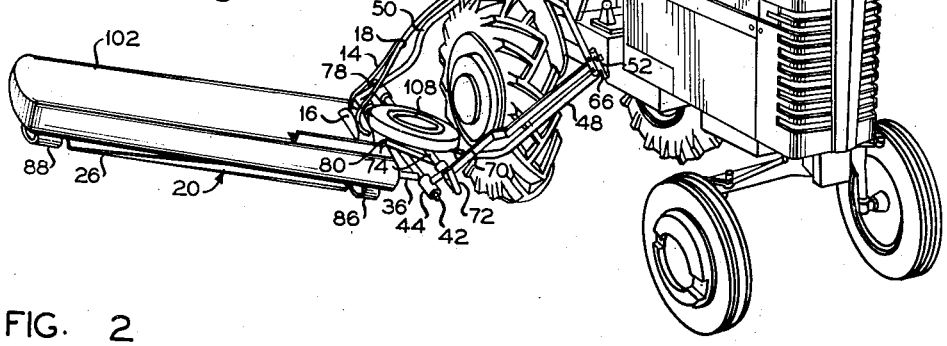
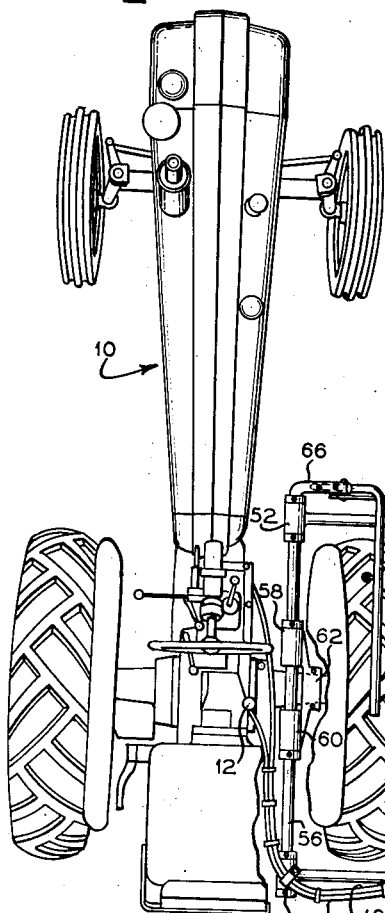
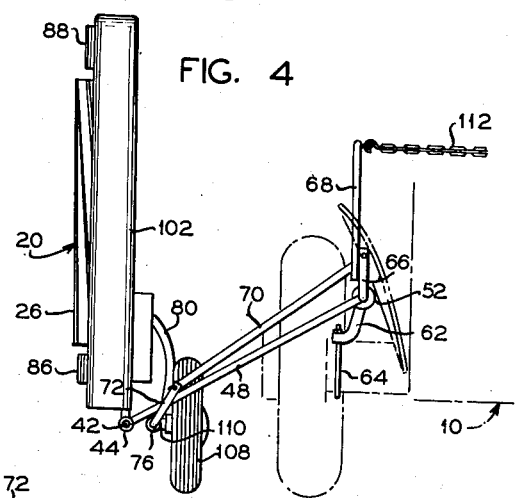
INVENTORS
ALEXANDER SMITH
B. D. BAGGS, JR.
BY
A. Yates Dowell
ATTORNEY Patented Jan. 12, 1954

2,665,621

UNITED STATES PATENT OFFICE 2,665,621

CULTIVATOR ATTACHMENT

Alexander Smith and Burton Durant Baggs, Jr., Sanford, Fla.

Application April 13, 1951, Serial No. 220,812

7 Claims. (Cl. 97—40)

This invention relates to earth working apparatus and more particularly to a cultivator attachment for tractors or other power units which automatically adapts itself to the inclination of the ground and is particularly useful in the cultivation of orchards or other areas where there are many obstacles which must be avoided.

Numerous cultivators have been proposed which are provided with spiral blades adapted to dig into the earth to a predetermined depth for breaking up the surface and removing weeds to promote the growth of certain crops. However, these cultivating devices, as previously proposed, have not been adapted for cultivation in orange groves, orchards and other areas where there are numerous impediments to the movement of the cultivator.

One object of the present invention is to provide a cultivator attachment for tractors which is so constructed and arranged that it may be worked around and in close proximity to the trees in a grove or orchard or may be operated in a straight line by tilting the cultivator attachment from its normal operating position to a raised position while passing the trees.

A further object of the present invention is to provide a cultivator attachment which is mounted and arranged to extend laterally in an outboard position so the cultivator may be utilized on downwardly or upwardly inclined slopes such as those on the shoulders along highways and on inclined embankments.

Another object of the present invention is to provide an outboard cultivator attachment with a supporting wheel which is brought into engagement with the ground for supporting the outboard weight of the cultivator when it is raised into an upright position.

A still further object of the present invention is to provide a novel lever arrangement for supporting and actuating the cultivator attachment and a novel drive means for the rotary element of the cultivator as well as a novel arrangement of the other elements of the device.

Further objects and advantages of the invention will be apparent from the following description taken in conjunction with the drawings, wherein:

Fig. 1 is a perspective view of a tractor provided with one preferred embodiment of the cultivator attachment of the present invention shown in operating position for working on an upwardly inclined surface;

Fig. 2, a top plan view of a conventional tractor with the cultivator attachment shown in Fig. 1 in a horizontal operating position;

Fig. 3, a sectional view taken on the line 3—3 of Fig. 2; and

Fig. 4, a front elevational view of the cultivator attachment in raised position with its weight supported on the auxiliary wheel and portions of the tractor shown in phantom lines.

Referring now to the drawings in detail, a conventional tractor 10, as shown in Figs. 1 and 2, is provided with the usual hydraulic system which is actuated by the control knob 12 to supply fluid under pressure through a conduit 14 which extends to a hydraulic turbine 16, the fluid being returned to the crankcase of the tractor by another conduit 18.

Turbine 16 is adapted to drive an elongated rotor 20 through suitable enclosed reduction gearing (not shown). The rotor 20 consists of circular end plates 22 and 24 which may be provided with lugs to which the detachable plates 26 may be removably secured. Rotor 20 is mounted on a shaft 28 extending through the housing of the turbine 16 and supported in a suitable bearing 30 mounted on the cross member 32 of the elongated framework 34.

Framework 34 is provided with spaced substantially parallel bars 36 and 38 and a curved end bar 40 across its outer end. Framework 34 is rigidly secured to a transverse shaft 42 rotatably mounted adjacent its opposite ends in bearings 44 and 46 which are attached to the outer ends of the swinging arms 48 and 50. The arms 48 and 50 are pivotally mounted by sleeves 52 and 54 on a rotatable shaft 56 which is mounted in bearings 58 and 60 formed on a bracket 62 which is detachably clamped to the right hand axle of the tractor by means of a yoke 64.

The forward end of the shaft 56 is bent over at substantially right angles to form an arm 66 which has an operating lever 68 rigidly secured thereto. A link 70 is pivotally connected to the arm 66 at one end and at its opposite end is pivotally connected to an operating arm 72 formed on the transverse shaft 74 which is rotatably mounted in the bearings 76 and 78 secured to the arms 48 and 50 respectively in spaced relation to bearings 44 and 46. A curved arm 80 which is rigidly secured to shaft 74 extends outwardly therefrom and is pivotally connected at 82 to a sleeve 84 which is slidably mounted on the bar 36.

A pair of skids 86 and 88 are pivotally mounted on the bar 36 at one end and are adjustably positioned with relation to the rotor 20 by means of bolts 90 and 92 which engage the skids adjacent their opposite ends in a manner which is clearly shown in Fig. 3, wherein the bolt 92 is shown extending through the plate 94 and maintained in adjusted position by the lock nuts 96 and 98. A scraper blade 100 is rigidly mounted on the bar 38 and terminates in closely spaced contiguous relation with the edges of the blades 26. It is also desirable to provide a sheet metal cover 102 which is hinged at 104 to the bar 36 and supported adjacent its opposite edge by several brackets 106 attached to the bar 38.

An auxiliary wheel 108 is rotatably mounted on a stub shaft 110 which is rigidly secured to shaft 74 as shown in Fig. 4. The operating lever 68 is retained in an upright position, when the cultivator is raised and supported on the wheel 108, by means of a chain 112 suitably attached to the tractor body.

In the use of the cultivator attachment the device is transported to the location, where it is to be utilized, in the position shown in Fig. 4 with the weight of the cultivator carried on the auxiliary wheel 108. When the tractor is in a position to start the cultivation of the ground, chain 112 is released and the cultivator is dropped into a ground contacting position by means of a lever 68 which may be manually operated or if desired the lever 68 may be operatively connected to a hydraulic piston or other conventional operating mechanism usually provided on a farm tractor.

The cultivator will automatically adjust itself to the slope of the ground on which it is being used, whether it is flat and horizontal or inclined upwardly or downwardly, and, as clearly shown in Fig. 1, the auxiliary wheel is rotated from the ground contacting position shown in Fig. 4 to an inoperative position by the link 70 and shaft 74 at the same time the curved arm 80 rotates the frame 34 moving the cultivator rotor 20 into ground engaging position.

If desired, the cultivator can be worked directly up against a tree with the outer end of the cultivator engaging the tree, since the outer end of the cover 102 is supported by the curved end bar 40. This structure will automatically space the outer ends of the cultivator rotor 20 a fixed distance away from the base of the tree and prevent cultivation too close in a manner which might damage the roots.

The cultivator may also be worked in a straight line with the outer portion in line with a row of trees, and, as each tree is approached, the cultivator may be raised by means of the operating lever 68 or suitable operating mechanism (not shown) until the tree has been passed and the cultivator is again lowered to its operating position.

The hydraulic turbine 16 is coupled to the conduits 14 and 18 in such manner that the rotor 20 is rotated in the clockwise direction indicated by the arrow in Fig. 3, while the tractor is moved in a forward direction. The rotor 20 is driven at a substantially higher peripheral speed than the linear speed of the tractor so that the cultivator attachment will tend to drive itself by engagement of the blades 26 with the ground. The scraper blade 100 will tend to break up large clods of earth which may be retained on the blades 26 and tends to keep the blades cleared.

While applicant has shown one preferred form of the invention, it will be obvious that the present device may be adapted for use in conjunction with various types of tractors or may be modified and constructed on a smaller scale for use with a small power unit such as those used in gardening.

It will be obvious to those skilled in the art that various changes may be made in the invention without departing from the spirit and scope thereof and therefore the invention is not limited by that which is shown in the drawings and described in the specification but only as indicated in the appended claims.

We claim:

1. A cultivator attachment for tractors comprising a bracket adapted to be mounted on the axle of a tractor, bearings mounted on said bracket with their axes extending longitudinally of the tractor, a shaft rotatably mounted in said bearings and having an operating lever secured to one end thereof, an outwardly extending arm rotatably mounted on each of the opposite ends of said shaft, a framework pivotally mounted on the outer ends of said arms, a hydraulic turbine mounted on said framework and provided with conduits for connection to the hydraulic system of the tractor, said turbine having an outwardly extending shaft driven thereby, a rotor mounted on said driven shaft and provided with a plurality of detachable helical blades, a second shaft rotatably mounted on said arms in spaced relation from the outer ends thereof, a stub shaft extending from said second shaft, an auxiliary wheel rotatably mounted on said stub shaft, an operating arm on one end of said second shaft, a link pivotally connected at one end to said operating lever and at its opposite end to said operating arm, a sleeve slidably mounted on said framework, a curved arm rigidly secured to said second shaft and having its outer end pivotally connected to said sleeve, skids pivotally mounted under said framework and having means for adjustment relative to said rotor, a scraper blade mounted on said framework and terminating in closely spaced contiguous relation to said blades, and a cover pivotally connected to the forward edge of said framework.

2. A cultivator attachment for tractors comprising a bracket adapted to be mounted on the axle of a tractor, bearings mounted on said bracket with their axes extending longitudinally of the tractor, a shaft rotatably mounted in said bearings and having an operating lever secured to one end thereof, an outwardly extending arm rotatably mounted on each of the opposite ends of said shaft, a framework pivotally mounted on the outer ends of said arms, a hydraulic turbine mounted on said framework and provided with conduits for connection to the hydraulic system of the tractor, said turbine having an outwardly extending shaft driven thereby, a rotor mounted on said driven shaft and provided with a plurality of detachable helical blades, a second shaft rotatably mounted on said arms in spaced relation from the outer ends thereof, a stub shaft extending from said second shaft, an auxiliary wheel rotatably mounted on said stub shaft, an operating arm on one end of said second shaft, a link pivotally connected at one end to said operating lever and at its opposite end to said operating arm, a sleeve slidably mounted on said framework, and a curved arm rigidly secured to said second shaft and having its outer end pivotally connected to said sleeve.

3. A cultivator attachment for tractors comprising a shaft adapted to be rotatably mounted on a tractor longitudinally thereof and having an operating lever secured to one end thereof, an outwardly extending arm rotatably mounted on each of the opposite ends of said shaft, a framework pivotally mounted on the outer ends of said arms, a hydraulic turbine mounted on said framework and provided with conduits for connection to the hydraulic system of the tractor, said turbine having an outwardly extending shaft driven thereby, a rotor mounted on said driven shaft and provided with a plurality of detachable helical blades, a second shaft rotatably mounted on said arms in spaced relation from the outer ends thereof, a stub shaft extending from said second shaft, an auxiliary wheel rotatably mounted on said stub shaft, an operating arm on one end of said second shaft, a link pivotally connected at one end to said operating lever and at its opposite end to said operating arm, a sleeve slidably mounted on said framework, and a curved arm rigidly secured to said second shaft and having its outer end pivotally connected to said sleeve.

4. A cultivator attachment for tractors comprising a shaft adapted to be rotatably mounted on a tractor longitudinally thereof and having an operating lever secured to one end thereof, an outwardly extending arm rotatably mounted on each of the opposite ends of said shaft, a framework pivotally mounted on the outer ends of said arms, drive means mounted on said framework and having an outwardly extending shaft driven thereby, a rotor mounted on said driven shaft and provided with a plurality of helical blades, a second shaft rotatably mounted on said arms in spaced relation from the outer ends thereof, a stub shaft extending from said second shaft, an auxiliary wheel rotatably mounted on said stub shaft, an operating arm on one end of said second shaft, a link pivotally connected at one end to said operating lever and at its opposite end to said operating arm, a sleeve slidably mounted on said framework, and a curved arm rigidly secured to said second shaft and having its outer end pivotally connected to said sleeve.

5. A cultivator attachment for tractors comprising a shaft adapted to be rotatably mounted on a tractor longitudinally thereof and having an operating lever secured to one end thereof, an outwardly extending arm rotatably mounted on each of the opposite ends of said shaft, a framework pivotally mounted on the outer ends of said arms, drive means mounted on said framework and having an outwardly extending shaft driven thereby, a rotor mounted on said driven shaft and provided with a plurality of helical blades, a second shaft rotatably mounted on said arms in spaced relation from the outer ends thereof, an auxiliary wheel mounted on said second shaft for rotation about an axis transverse thereto, an operating arm on one end of said second shaft, a link pivotally connected at one end to said operating lever and at its opposite end to said operating arm, and another arm rigidly secured to said second shaft and having its outer end pivotally and slidably connected to said framework.

6. A cultivator attachment for tractors comprising a shaft adapted to be rotatably mounted on a tractor longitudinally thereof and having an operating lever secured to one end thereof, an outwardly extending arm rotatably mounted on each of the opposite ends of said shaft, an implement frame pivotally mounted on the outer ends of said arms, a second shaft rotatably mounted on said arms in spaced relation from the outer ends thereof, an auxiliary wheel mounted on said second shaft for rotation about an axis transverse thereto, an operating arm on one end of said second shaft, a link pivotally connected at one end to said operating lever and at its opposite end to said operating arm, and another arm rigidly secured to said second shaft and having its outer end pivotally and slidably connected to said framework.

7. A cultivator attachment for tractors comprising a first shaft adapted to be rotatably mounted on a tractor longitudinally thereof and having an operating lever secured thereto, outwardly extending arms rotatably mounted in spaced relation on said first shaft, a framework pivotally mounted on said arms in spaced relation to said first shaft, drive means mounted on said framework and having an outwardly extending shaft driven thereby, a rotary cultivating element mounted on said driven shaft, a second shaft rotatably mounted on said arms in spaced relation from said first shaft, an auxiliary wheel mounted on said second shaft for rotation about an axis transverse thereto, an operating arm on said second shaft, a link pivotally connecting said operating lever and said operating arm, and another arm rigidly secured to said second shaft and pivotally and slidably connected to said framework.

ALEXANDER SMITH.
BURTON DURANT BAGGS, Jr.

References Cited in the file of this patent

UNITED STATES PATENTS

| Number | Name | Date |
|---|---|---|
| 1,274,499 | Beasley | Aug. 6, 1918 |
| 1,370,219 | Miller | Mar. 1, 1921 |
| 1,912,706 | Goodman | June 6, 1933 |
| 2,197,305 | Hirak | Apr. 16, 1940 |
| 2,457,693 | Leicy | Dec. 28, 1948 |
| 2,539,174 | Baideme et al. | Jan. 23, 1951 |